United States Patent Office 3,446,901
Patented May 27, 1969

3,446,901
ANTIDEPRESSANT COMPOSITIONS CONTAINING DIPHENYLPROPYLAMINE DERIVATIVES
Geraint Jones, Macclesfield, England, assignor to Ed. Geistlich Sohne AG fur Chemische Industrie, Wolhusen, Switzerland, a Swiss body corporate
No Drawing. Filed July 21, 1967, Ser. No. 654,953
Claims priority, application Great Britain, Aug. 25, 1966, 38,196/66
Int. Cl. A61k 27/00
U.S. Cl. 424—330    4 Claims

ABSTRACT OF THE DISCLOSURE

Pharmaceutical compositions, for example tablets, containing a diphenylpropylamine derivative, for example N,N - dimethyl - 3,3 - diphenylpropylamine hydrochloride. Useful as antidepressants.

---

This invention relates to new pharmaceutical compositions having antidepressant activity.

Certain 3,3-diphenylpropylamine derivatives are known compounds, but it was not known heretofore that compounds of this type were useful as antidepressants. We have now made the unexpected discovery that compounds of this type have antidepressant activity, and therein lies the basis of this invention.

According to the invention we provide pharmaceutical compositions comprising at least one alkane derivative of the formula:

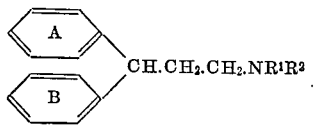

wherein $R^1$ stands for hydrogen or an alkyl radical, $R^2$ stands for an alkyl radical, and either or both of the phenyl radicals A and B may optionally be substituted with one or two substituents selected from halogen atoms and trifluoromethyl, alkyl and alkoxy radicals or an acid-addition salt thereof, and a pharmaceutically-acceptable diluent or carrier.

As a suitable value for $R^2$, or for $R^1$ when it stands for an alkyl radical, there may be mentioned, for example, an alkyl radical of not more than 6 carbon atoms and more particularly an alkyl radical of not more than 2 carbon atoms, for example the methyl or ethyl radical.

The substituent(s) which may optionally be present in either or both of the phenyl radicals A and B may, for example, be selected from fluorine and chlorine atoms, the trifluoromethyl radical, and alkoxy and alkyl radicals of not more than 3 carbon atoms, for example the methoxy or methyl radical.

A preferred group of active ingredients consists of alkane derivatives of the above formula wherein $R^1$ stands for hydrogen or the methyl radical, $R^2$ stands for the methyl or ethyl radical, and either or both of the phenyl radicals A and B may optionally be substituted with one or two substituents selected from halogen atoms and the trifluoromethyl radical.

As alkane derivatives which may be used as active ingredients in the pharmaceutical compositions of the invention there may be mentioned, for example, the known compounds N,N-dimethyl-3,3-diphenylpropylamine, N-methyl-3,3-diphenylpropylamine, and N-ethyl-N-methyl-3,3-diphenylpropylamine, and the new compounds:

N,N-dimethyl-3,3-bis-(4-fluorophenyl)propylamine,
N,N-dimethyl-3-(4-fluorophenyl)-3-phenylpropylamine,
N,N-dimethyl-3-(4-chlorophenyl)-3-phenylpropylamine,
N,N-dimethyl-3-(3-fluorophenyl)-3-phenylpropylamine,
N,N-dimethyl-3-(2-methylphenyl)-3-phenylpropylamine,
N,N-dimethyl-3-(2-methoxyphenyl)-3-phenylpropylamine,
N,N-dimethyl-3,3-bis-(4-chlorophenyl)propylamine,
N,N-dimethyl-3-(4-chlorophenyl)-3-(4-fluorophenyl)propylamine,
N,N-dimethyl-3,3-bis-(3-fluorophenyl)propylamine,
N-methyl-3,3-bis-(4-fluorophenyl)propylamine,
N,N-dimethyl-3,3-bis-(3-trifluoromethylphenyl)propylamine and
N,N-dimethyl-3-(3-trifluoromethylphenyl)-3-phenylpropylamine, and acid-addition salts thereof.

As suitable acid-addition salts there may be mentioned salts derived from inorganic or organic acids affording pharmaceutically-acceptable anions, for example hydrochlorides, oxalates, citrates, maleates or tartrates.

Suitable pharmaceutically-acceptable diluents or carriers for use as excipients in the compositions of the invention are those known to the art and used in the preparation of pharmaceutical formulations for human and veterinary medication.

The pharmaceutical compositions of the invention include compositions which are suitable for oral administration. These include, for example, solid compositions, for example tablets, pills, capsules, dispersible powders and granules, which may optionally be coated, for example with a sweetening agent and/or a protective material designed to modify the distribution and absorption of the active ingredient or ingredients in the digestive tract. They also include orally-administerable semi-solid or liquid formulations, for example pharmaceutically-acceptable emulsions, syrups, dispersions and solutions, either for administration per se with or without flavouring agents or after confinement in some suitable way, for example in capsules.

The pharmaceutical compositions of the invention also include liquid compositions which are sterile aqueous solutions, suspensions or emulsions, or sterile non-aqueous solutions or suspensions which can be administered by injection, for example intravenously, subcutaneously or intramuscularly. Those injectable compositions of the invention which are suspensions contain their particulate matter in a finely divided form, for example in a micro-pulverised form, and those compositions which are aqueous suspensions may optionally contain small amounts of such agents as are commonly used to facilitate the manufacture and maintain the efficacy of aqueous suspensions, for example dispersing agents and suspending agents.

Suitable vehicles for the non-aqueous solutions and suspensions of the invention include, for example, water-miscible non-toxic vehicles, for example propylene glycol and polyethylene glycol, and water-immiscible non-toxic vehicles, for example injectable vegetable oils, for example arachis oil, and oil-like injectable organic esters, for example dibutyl succinate. The said water-immiscible vehicles may also contain metallic soaps, for example aluminium stearate.

The sterile injectable solutions, suspensions or emulsions of the invention may be obtained sterile by known procedures, for example by aseptic formulation, by Seitz filtration, by irradiation, by the incorporation of sterilising agents in the compositions, or by heat treatment.

The compositions of the invention include pharmaceutical compositions which are sterile powders comprising the active ingredient or ingredients together with such non-toxic pharmaceutical excipients as are required to provide, on mixing with water, sterile aqueous solutions or suspensions suitable for parenteral administration.

The alkane derivatives which are used as the active ingredients in the pharmaceutical compositions of this invention may be obtained by the reduction of an alkene derivative of the formula:

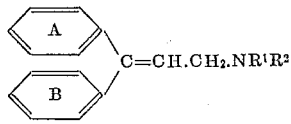

wherein A, B, R¹ and R² have the meanings stated above, or an acid-addition salt thereof, or by analogous means.

The invention is illustrated but not limited by the following example in which the parts are by weight:

Example

A mixture of 25 parts of N,N-dimethyl-3,3-diphenylpropylamine hydrochloride, 125 parts of maize starch, 270 parts of calcium phosphate and 1 part of magnesium stearate is compressed, and the compressed material is then broken down into granules by passage through a 16-mesh screen. The granules so obtained are then compressed into tablets which are suitable for oral administration for therapeutic purposes.

In place of the 25 parts of N,N-dimethyl-3,3-diphenylpropylamine hydrochloride used in the above example there may be used 25 parts of any of the following compounds:

N - methyl - 3,3 - diphenylpropylamine hydrochloride,
N - ethyl - 3,3 - diphenylpropylamine hydrochloride or N-ethyl - N - methyl - 3,3 - diphenylpropylamine hydrochloride.

The alkane derivatives which are used as active ingredients in the pharmaceutical compositions of this invention are active in a procedure that is standard in the art for testing for antidepressant agents. These results were obtained in standard experimental animals (mice), and they presumptively indicate that said derivatives may be used in the treatment of man needing antidepressant activity. On the basis of results in standard experimental animals we consider that said derivatives may be used clinically in man in orally-administrable formulations, for example tablets or capsules, at a total daily oral dose of 30 to 300 mg. per 70 kg. man.

What I claim is:

1. A method for effecting an antidepressant action in man in need of such action which comprises administering to said man an effective amount of a compound selected from the group consisting of alkane derivatives of the formula:

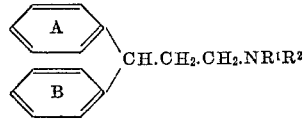

wherein R¹ is selected from the group consisting of hydrogen and methyl, R² is selected from the group consisting of methyl and ethyl, A is selected from the group consisting of phenyl, fluorophenyl, chlorophenyl and trifluoromethylphenyl, and B is selected from the group consisting of phenyl, fluorophenyl, chlorophenyl, trifluoromethylphenyl, methylphenyl and methoxyphenyl, and acid-addition salts thereof.

2. A method as claimed in claim 1 which comprises administering to man an effective amount of a compound selected from the group consisting of alkane derivatives of the formula:

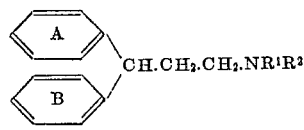

wherein R¹ is selected from the group consisting of hydrogen and methyl, R² is selected from the group consisting of methyl and ethyl, and A and B are selected from the group consisting of phenyl, fluorophenyl, chlorophenyl and trifluoromethylphenyl, and acid-addition salts thereof.

3. A method as claimed in claim 1 which comprises administering to man an effective amount of a compound selected from the group consisting of N,N-dimethyl-3,3-diphenylpropylamine and acid-addition salts thereof.

4. A method as claimed in claim 1 which comprises administering said compound at a total daily oral dose of 30 to 300 mg. per 70 kg. man.

References Cited

FOREIGN PATENTS 607,436  10/1960  Canada.

OTHER REFERENCES

Fine Chemicals Patent Journal, 6, No. 18, British 323–324 (May 6, 1966), p. 3, 260–570.

Brit. J. Pharm. 6, 560 (1951), pp. 560–562 and 568–569.

ALBERT T. MEYERS, *Primary Examiner.*

S. J. FRIEDMAN, *Assistant Examiner.*